UNITED STATES PATENT OFFICE.

ANGELINE ELBERSON, OF FINDLAY, OHIO.

POULTICE.

SPECIFICATION forming part of Letters Patent No. 308,243, dated November 18, 1884.

Application filed May 14, 1884. (No specimens.)

*To all whom it may concern:*

Be it known that I, ANGELINE ELBERSON, of Findlay, in the county of Hancock and State of Ohio, have invented a new and Improved Composition for Poultices for Treating Diphtheria and other Diseases, of which the following is a specification.

The subject of my invention is a remedy for outward application in the form of a poultice, consisting of meal of beans of any kind—or peas as a substitute therefor—pine-tar, and carbolic acid. This I prepare by boiling the meal to a pulp and straining through a sieve, after which I add to each gallon of the pulp of proper consistence for poultice one-half pint of pine-tar and half a dram of liquefied carbolic acid.

In diphtheria the poultice is applied to the exterior of the throat, extending from ear to ear, and must be kept moist by occasional application of warm water, or it may be rendered less liable to dry by the application of lard or oil.

Where the disease is complicated with croup, lard is added to the poultice.

This poultice is highly beneficial and successful as an outward application in the cure of diphtheria and of throat symptoms in scarlet fever, also for felons, carbuncles, and abcesses of all kinds.

In the treatment of diphtheria it is used in conjunction with chlorate of potash or other usual remedies applied to the interior of the throat. I also paint or swab the interior of the throat with a mixture of one ounce of tar, one ounce of linseed, olive, or lard oil, and ten drops of liquefied carbolic acid, and I drop the same mixture lightly over the surface of the poultice for external application.

As an additional treatment, in order to remove the false membrane in diphtheria, I employ powdered sage and sulphur mixed in equal parts and applied to the interior of the surface of the throat and mouth by blowing.

I am aware that the use of beans as a material for poultices was proposed many years ago.

Having thus described my invention, the following is what I claim as new therein and desire to secure by Letters Patent:

The composition of meal of beans, peas, or the like, tar, and carbolic acid, for use in poultices for the treatment of diphtheria.

ANGELINE ELBERSON.

Witnesses:
 OCTAVIUS KNIGHT,
 HARRY E. KNIGHT.